(12) United States Patent
Oishi (10) Patent No.: US 6,275,355 B1
(45) Date of Patent: Aug. 14, 2001

(54) MAGNETIC DISC CARTRIDGE AND MAGNETIC DISC DRIVE SYSTEM

(75) Inventor: Kengo Oishi, Kanagawa-ken (JP)

(73) Assignee: Fuji Photo Film Co., Ltd. (JP)

( * ) Notice: Subject to any disclaimer, the term of this patent is extended or adjusted under 35 U.S.C. 154(b) by 0 days.

(21) Appl. No.: 09/091,532

(22) PCT Filed: Dec. 13, 1996

(86) PCT No.: PCT/JP96/03638

§ 371 Date: Jun. 19, 1998

§ 102(e) Date: Jun. 19, 1998

(87) PCT Pub. No.: WO97/22970

PCT Pub. Date: Jun. 26, 1997

(30) Foreign Application Priority Data

Dec. 20, 1995 (JP) .................................................... 7-331451
Jan. 23, 1996 (JP) .................................................... 8-009254

(51) Int. Cl.⁷ .................................................... G11B 23/03
(52) U.S. Cl. .................................................... 360/133
(58) Field of Search .................................. 360/133, 99.02, 360/99.06; 369/77.2, 291

(56) References Cited

U.S. PATENT DOCUMENTS

| | | | |
|---|---|---|---|
| 5,063,554 | | 11/1991 | Uehara . |
| 5,091,815 | * | 2/1992 | Suzuki ................................ 360/133 |
| 5,163,037 | * | 11/1992 | Ohmori et al. ...................... 369/77.2 |
| 5,196,978 | * | 3/1993 | Washo et al. ........................ 360/133 |
| 5,422,775 | * | 6/1995 | Martin ................................ 360/133 |
| 5,548,571 | * | 8/1996 | Mistretta ............................. 369/77.2 |
| 5,629,819 | * | 5/1997 | Kitano ................................ 360/99.02 |
| 5,745,451 | * | 4/1998 | Mukawa et al. ................... 369/44.29 |
| 5,748,420 | * | 5/1998 | Ko et al. ............................... 360/133 |
| 5,799,009 | * | 8/1998 | Takahashi et al. ................... 369/291 |
| 5,805,566 | * | 9/1998 | Kobayashi et al. .................. 369/291 |
| 5,859,829 | * | 1/1999 | Otsuka et al. ...................... 369/77.2 |
| 5,886,859 | * | 3/1999 | Oishi ................................... 360/133 |
| 6,137,770 | * | 10/2000 | Fujisawa ............................ 369/291 |

FOREIGN PATENT DOCUMENTS

| | | |
|---|---|---|
| 0 368 416 A1 | 5/1990 | (EP) . |
| 0 439 286 A2 | 7/1991 | (EP) . |
| 082 41 582 | 9/1996 | (JP) . |
| 082 49 858 | 9/1996 | (JP) . |

* cited by examiner

Primary Examiner—Brian E. Miller
(74) Attorney, Agent, or Firm—Brinks Hofer Gilson & Lione; G. Peter Nichols (57) ABSTRACT

This invention is directed to obtaining a magnetic disc cartridge which is prevented from being inserted into a disc drive system for a smaller capacity magnetic disc cartridge before the magnetic head is brought into contact with the magnetic disc. A larger capacity magnetic disc (12) is contained for rotation in a casing (10). The casing (10) is provided with a first cutaway portion (15) at a front corner between the front edge and one side edge of the casing. The first cutaway portion (15) is common to that of a smaller capacity magnetic disc cartridge for preventing insertion of a smaller capacity magnetic disc cartridge in a wrong direction. A second cutaway portion (16) which is adapted to engage with an engagement member (55) of the smaller-disc drive system which is brought into engagement with the first cutaway portion (15) and is displaced is formed on said one side edge of the casing.

2 Claims, 5 Drawing Sheets

MAGNETIC DISC CARTRIDGE AND MAGNETIC DISC DRIVE SYSTEM

FIELD OF THE INVENTION

This invention relates to a magnetic disc cartridge which comprises a large capacity magnetic disc medium contained in a casing and is used in a magnetic recording and reproduction in which the magnetic disc medium is rotated at high speed, and more particularly to such a magnetic disc cartridge which is provided with a means for preventing the magnetic disc cartridge from being loaded in a magnetic disc drive system for smaller capacity magnetic disc cartridges. Further this invention relates to a magnetic disc drive system for driving the large capacity magnetic disc cartridge.

BACKGROUND

There has been known a magnetic disc, a so-called floppy disc, which comprises magnetic layers formed on opposite sides of a flexible disc base of a polyester sheet or the like. Information is recorded on the floppy disc by a magnetic head while rotating the floppy disc at high speed. Such floppy discs have been mainly used as recording media for computers because they are easy to handle and can be produced at low cost.

Recently the magnetic disc of this type is generally held for rotation in a small hard casing and used in the form of a magnetic disc cartridge as represented by a 3.5-inch floppy disc.

In the magnetic disc cartridge with a hard casing, the casing is provided with an opening for giving a magnetic head access to the magnetic disc therein and the opening is normally closed by a shutter urged in one direction so that foreign matters such as dust cannot enter the casing.

There has been constant demand for a magnetic disc cartridge having a larger storage capacity and 3.5-inch floppy discs having a storage capacity of 1 MB or 2 MB have been put into practice. Further even 3.5-inch floppy discs having a storage capacity of not smaller than 100 MB have been provided.

When a magnetic disc cartridge larger than conventional magnetic disc cartridges in storage capacity is developed, a novel disc drive system for driving the magnetic disc cartridge having a larger storage capacity is sometimes provided. Such a novel disc drive system is generally arranged to be able to drive magnetic disc cartridges having smaller storage capacities as well as the newly developed larger capacity magnetic disc cartridge. Such capability of driving magnetic disc cartridges having smaller storage capacities as well as the newly developed larger capacity magnetic disc cartridge will be referred to as "downward compatibilities", hereinbelow.

In order to provide a disc drive system with such downward compatibilities, the newly developed larger capacity magnetic disc cartridge should be substantially the same as the conventional magnetic disc cartridges in appearance and the like. Accordingly, there is fear that the newly developed larger capacity magnetic disc cartridge is loaded in a disc drive system for the conventional smaller capacity magnetic disc cartridges. The disc drive system for the conventional smaller capacity magnetic disc cartridges will be referred to as "smaller-disc drive system" and the disc drive system for newly developed larger capacity magnetic disc cartridges will be referred to as "larger-disc drive system", hereinbelow.

Generally the smaller-disc drive system is not provided with function for satisfactorily protecting the newly developed larger capacity magnetic disc cartridge, and when the disc drive system is operated loaded with the newly developed large capacity magnetic disc cartridge, information stored in the magnetic disc can be destroyed.

Though accidental recording or erasure can be prevented by providing, for instance, a hole for distinguishing the storage capacity on cartridges, when a larger capacity magnetic disc cartridge is accidentally loaded in a smaller-disc drive system and a magnetic head of the smaller disc drive system is brought into contact with the magnetic disc medium in the magnetic disc cartridge, there is fear that foreign matters or dust on the magnetic head adhere to the magnetic disc medium.

Since the larger capacity magnetic disc is obtained by increasing the recording density, the recording wavelength is shorter and the recording track is narrower. Accordingly when foreign matters are on the larger capacity magnetic disc medium, errors can be generated in reading out recorded data.

In view of the foregoing observations and description, the primary object of the present invention is to provide a larger capacity magnetic disc cartridge which cannot be loaded in a disc drive system exclusively for a magnetic disc cartridge having a smaller storage capacity.

Another object of the present invention is to provide a disc drive system for larger capacity magnetic disc cartridges.

DISCLOSURE OF THE INVENTION

A larger capacity magnetic disc cartridge in accordance with the present invention comprises a larger capacity magnetic disc medium held for rotation in a casing provided with an opening which gives a magnetic head access to the magnetic disc medium and is normally closed by a shutter. The casing is provided with a first cutaway portion at a front corner between the front edge and one side edge of the casing. The first cutaway portion is common to that of a smaller capacity magnetic disc cartridge for preventing insertion of a smaller capacity magnetic disc cartridge into the disc drive system in a wrong direction. The larger capacity magnetic disc cartridge in accordance with the present invention is characterized in that a second cutaway portion which is adapted to engage with an engagement member of the smaller-disc drive system which is brought into engagement with the first cutaway portion and is displaced is formed on said one side edge of the casing.

When the larger capacity magnetic disc cartridge of the present invention is inserted into the smaller-disc drive system, the engagement member of the disc drive system is displaced laterally or vertically by the first cutaway portion to permit insertion of the larger capacity magnetic disc cartridge to some extent. However when the engagement member comes to engage with the second cutaway portion, further insertion of the magnetic disc cartridge is prevented and accordingly the shutter of the magnetic disc cartridge is not opened.

For example, the second cutaway portion of the casing may comprise an inclined surface inclined inward from the front end of the second cutaway portion, a shoulder portion which extends substantially normal to the side edge at the rear end of the second cutaway portion and a parallel portion substantially parallel to the side edge and is substantially trapezoidal in shape. This arrangement of the second cutaway portion is especially useful in surely bringing the engagement member into engagement with the second cutaway portion when the engagement member is displaced vertically upon abutment against the first cutaway portion.

The engagement member can be more surely brought into engagement with the second cutaway portion when the distance of the parallel portion from the side edge of the casing is substantially equal to or larger than the length by which the corner of the casing is cut to form the first cutaway portion as measured in the direction normal to the side edge and the length of the parallel portion as measured in the direction of the side edge is substantially equal to or larger than the width of the engagement member of the smaller-disc drive system as measured in the direction of the side edge of the magnetic disc cartridge.

Further when the second cutaway portion has said inclined surface, the engagement member in engagement with the second cutaway portion can be easily disengaged from the second cutaway portion when the magnetic disc cartridge is drawn.

When the casing is not provided on its front edge with a recess for inserting a shutter opening lever, the larger capacity magnetic disc cartridge can also be prevented from being loaded in a smaller-disc drive system in which insertion of a smaller capacity magnetic disc cartridge in a wrong direction is prevented not by an engagement member but by a shutter opening lever which is to be engaged with a recess on the front edge of the smaller capacity magnetic disc cartridge when the smaller capacity magnetic disc cartridge is inserted in the regular direction.

In accordance with the present invention, there is further provided a larger-disc drive system for driving a larger capacity magnetic disc cartridge described above. The larger-disc drive system is characterized by having an engagement member which is arranged so that it is displaced to permit insertion of the larger capacity magnetic disc cartridge only when the larger capacity magnetic disc cartridge is inserted into the larger-disc drive system in a direction where the first cutaway portion is brought into abutment against the engagement member and cannot be engaged with the second cutaway portion.

In this disc drive system, the second cutaway portion of the larger capacity magnetic disc cartridge does not interfere with the engagement member of the disc drive system and accordingly the larger capacity magnetic disc cartridge can be properly loaded in the disc drive system so long as it is inserted in the regular direction.

For example, the engagement member of the larger-disc drive system can be arranged not to be engaged with the second cutaway portion by arranging the engagement member so as to contact with the side edge of the casing over a length larger than the length of the second cutaway portion.

Thus in accordance with the present invention, insertion of the larger capacity magnetic disc cartridge into a smaller-disc drive system can be prevented before the shutter is opened in the smaller-disc drive system, and accordingly destruction of information stored in the larger capacity magnetic disc can be naturally prevented and at the same time since the magnetic disc medium in the cartridge is not brought into contact with the magnetic head of the smaller disc drive system, dust and the like cannot be transferred from the magnetic head to the magnetic disc medium, whereby occurrence of read-out error and the like can be prevented.

BEST MODE OF CARRYING OUT THE INVENTION

The present invention will be described in detail with reference to the drawings, hereinbelow.

First Embodiment

Figure 1:
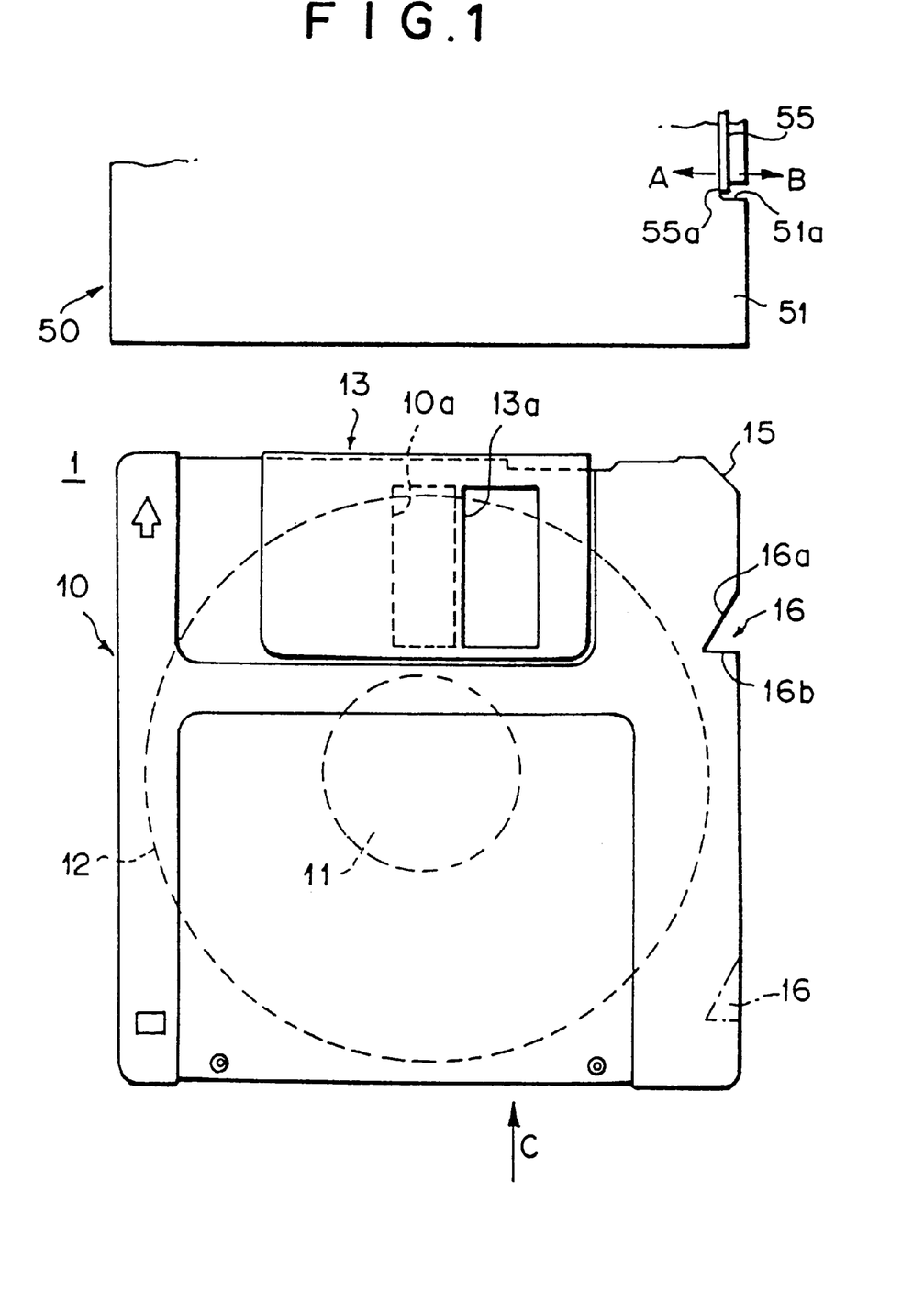
FIG. 1 is a plan view showing a larger capacity magnetic disc cartridge in accordance with a first embodiment of the present invention.

This example is an example where the smaller-disc drive system has an engagement member which is laterally displaced. FIG. 1 is a plan view showing a larger capacity magnetic disc cartridge in accordance with a first embodiment together with a part of the smaller-disc drive system, and FIG. 2 is a perspective view showing insertion action of the larger capacity magnetic disc cartridge.

A larger capacity magnetic disc cartridge 1 of this embodiment has a hard casing 10 formed of, for instance, synthetic resin. A center core 11 is held for rotation in the casing 10 and a magnetic disc medium 12 having a central opening is bonded to the center core 11. The magnetic disc medium 12 comprises magnetic layers formed on opposite sides of a flexible disc base of a polyester sheet or the like.

The hard casing 10 comprises a pair of shell halves mated together, and is provided with a head insertion opening 10a which gives a magnetic head access to the magnetic disc 12 on each side of the hard casing 10. A shutter 13 is mounted on the hard casing 10 to be slidable left and right to open and close the head insertion openings 10a. The shutter 13 is formed of stainless steel, aluminum or plastic such as polyacetal resin and is like a channel in cross-section. The shutter 13 is mounted to cover opposite sides of the front (as seen in the direction of insertion of the cartridge 1) edge portion of the hard casing 10 from outside the casing 10. The parts of the shutter 13 opposed to the respective sides of the casing 10 are respectively provided with openings 13a.

Figure 2:
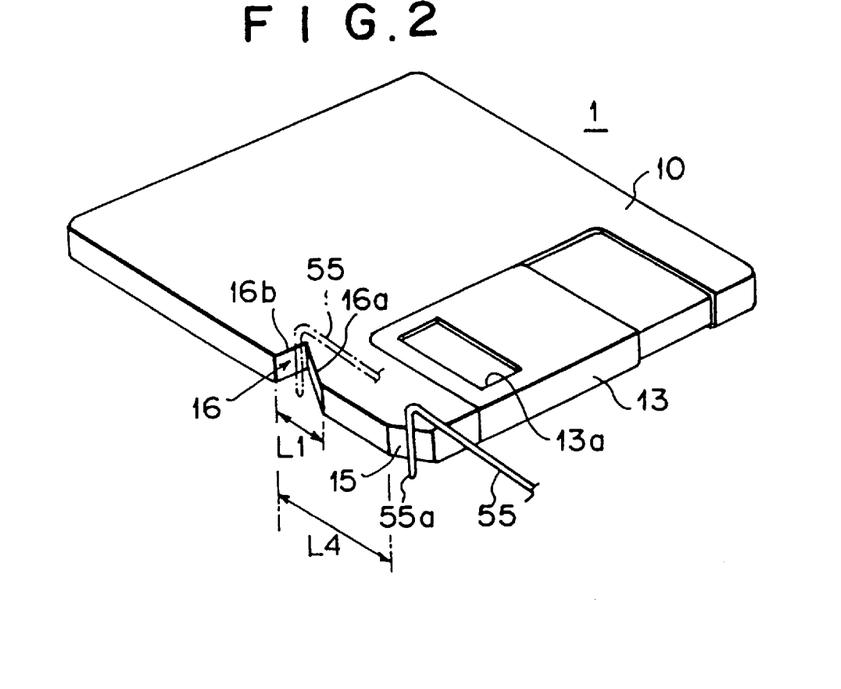
FIG. 2 is a perspective view for illustrating insertion of the larger capacity magnetic disc cartridge of FIG. 1 into the smaller capacity-disc drive system.

The shutter 13 is normally urged by a torsion spring toward its closing position shown in FIGS. 1 and 2 where the openings 13a are out of alignment with the head insertion openings 10a and the head insertion openings 10a are closed. That is, normally the head insertion openings 10a are closed by the shutter 13 so that foreign matters such as dust cannot enter the hard casing 10.

The right front (as seen in the direction of insertion C) corner of the casing 10 is obliquely cut to form a tapered surface, thereby forming a first cutaway portion 15 for preventing the magnetic disc cartridge 1 from being inserted into a disc drive system in a wrong direction. The first cutaway portion 15 is the same as the cutaway portion for preventing a smaller capacity magnetic disc cartridge 3 (to be described later with reference to FIG. 6) from being inserted into a disc drive system in a wrong direction.

A second cutaway portion 16 is formed on the side edge of the casing 10 on which the first cutaway portion 15 is formed. The second cutaway portion 16 is triangular in shape and has an inclined surface 16a inclined inward from the front end of the second cutaway portion 16 and a shoulder portion 16b which extends substantially normal to the side edge at the rear end of the second cutaway portion. The second cutaway portion 16 is formed in a depth sufficient to engage with an engagement member 55 of the smaller-disc drive system to be described later, that is, in a depth substantially equal to or smaller than the first cutaway portion 15.

Though it is preferred that the second cutaway portion 16 be formed forward of the center of the magnetic disc medium 12, the object of the present invention can be accomplished even if the second cutaway portion 16 is formed rearward of the center of the magnetic disc medium 12 as shown by the chained line.

A smaller-disc drive system 50 is provided with an engagement member 55 as shown in FIG. 1. The engagement member 55 is a resilient wire disposed on one side of a bucket 51 for guiding insertion of a magnetic disc cartridge. The engagement member 55 is bent downward to form an engagement portion 55a at one end thereof as shown in FIG. 2 and is fixed at the other end thereof (not shown) so that the engagement portion 55a is received in a notch 51a of the bucket 51 and urged against the bottom of the notch 51a in the direction of arrow A under the resiliency of the engagement member 55. When the engagement portion 55a is in abutment against the bottom of the notch 51a, the engagement portion 55a projects into the cartridge insertion passage of the bucket 51 so that the tapered surface of the first cutaway portion 15 is brought into abutment against the engagement portion 55a of the engagement member 55 as a magnetic disc cartridge is inserted into the bucket 51 in the regular direction.

That is, when a magnetic disc cartridge is inserted into the bucket 51 in the regular direction, the engagement portion 55a is brought into abutment against the first cutaway portion 15 of the magnetic disc cartridge and resiliently displaced outward (in the direction of arrow B) away from the cartridge insertion passage to permit insertion of the magnetic disc cartridge. On the other hand, when the magnetic disc cartridge is inserted into the bucket 51 in a wrong direction, e.g., upside down or in the reversed direction, the flat corner on the side opposite to the first cutaway portion 15 abuts against the engagement portion 55a of the engagement member 55. At this time, since the corner is not provided with a tapered surface, the engagement portion 55a cannot be displaced outward and prevents insertion of the magnetic disc cartridge.

When the larger capacity magnetic disc cartridge 1 is inserted into the smaller-disc drive system 50 in the regular direction, the engagement portion 55a of the engagement member 55 enters the second cutaway portion 16 under its resiliency and engages with the shoulder portion 16b as shown by the chained line in FIG. 2 to prevent further insertion of the magnetic disc cartridge 1. When the shoulder portion 16b is inclined toward the inclined surface 16a, the engagement portion 55a is more firmly engaged with the shoulder portion 16b and insertion of the larger capacity magnetic disc cartridge 1 can be more certainly prevented.

Though the larger capacity magnetic disc cartridge 1 of this embodiment is a so-called 3.5-inch magnetic disc cartridge, it has a storage capacity of 128 MB which is much larger than those of conventional 3.5-inch magnetic disc cartridges.

Figure 6:
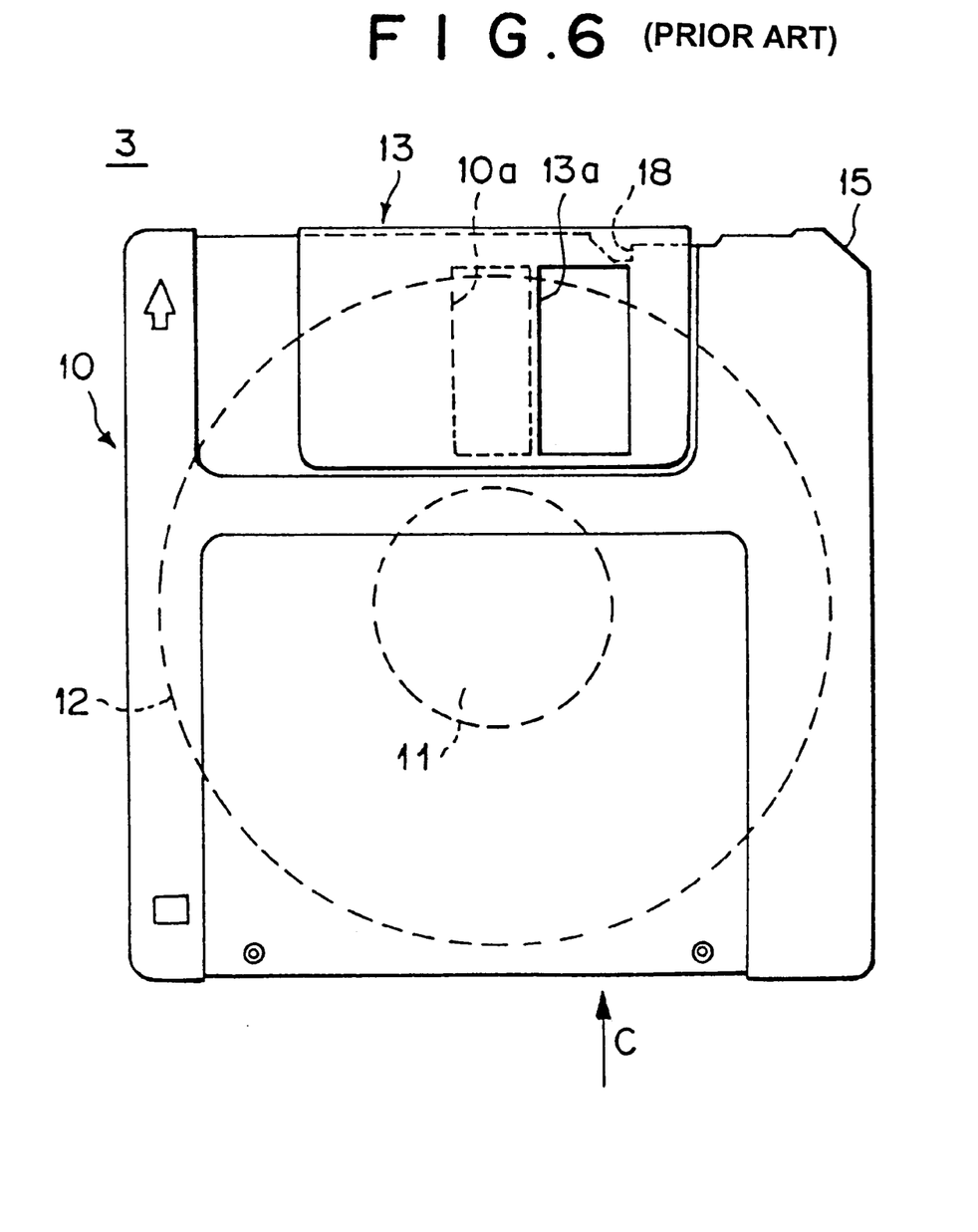
FIG. 6 is a plan view showing a conventional smaller capacity magnetic disc cartridge.

FIG. 6 shows a conventional 3.5-inch magnetic disc cartridge 3 having a storage capacity of, for instance, 1 MB as seen from the head side thereof. In FIG. 6, the elements analogous to those shown in FIG. 1 are given the same reference numerals and will not be described here.

As can be seen from comparison of FIG. 1 and FIG. 6, the magnetic disc cartridge 1 of this embodiment is substantially the same as the conventional magnetic disc cartridge 3 in profile but differs from the conventional magnetic disc cartridge 3 in that the magnetic disc cartridge 1 of this embodiment is provided with the second cutaway portion 16. Further, though the conventional magnetic disc cartridge 3 is provided with a recess 18 on the front edge of the casing 10 which is for inserting shutter opening lever (not shown) for opening and closing the shutter 13, the larger capacity magnetic disc cartridge 1 of this embodiment is not provided with such a recess. The recess 18 is provided to conform the magnetic disc cartridge 3 to another type of disc drive system in which insertion of a magnetic disc cartridge in a wrong direction is prevented by permitting movement of the bucket 51 and the magnetic head in response to insertion of a shutter opening/closing pin (not shown).

Insertion of the larger capacity magnetic disc cartridge 1 of this embodiment into the disc drive system of said another type is prevented since it is without recess 18 and accordingly movement of the bucket 51 and the magnetic head is prevented.

The magnetic disc cartridge 1 of this embodiment is driven by a larger-disc drive system having downward compatibilities. The larger-disc drive system is provided with an engagement member for preventing a magnetic disc cartridge from being inserted in a wrong direction which can be displaced by the first cutaway portion 15 to permit insertion of the magnetic disc cartridge but cannot be engaged with the second cutaway portion 16 on the casing 10 of the larger capacity magnetic disc cartridge 1 so that insertion of the larger capacity magnetic disc cartridge 1 is permitted so long as it is inserted in the regular direction. Examples of such an engagement member which can be employed in the larger-disc drive system are shown in FIGS. 3A to 3C.

Figure 3A:
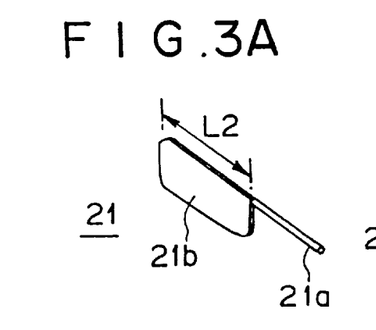
FIGS. 3A to 3C are fragmentary perspective views respectively showing examples of an engagement member employed in a larger capacity-disc drive system having downward compatibilities.

The engagement member 21 shown in FIG. 3A comprises a base portion 21a formed of a resilient material and an engagement portion 21b which is in the form of a flat plate of a predetermined length L2. That is, the length L2 of the engagement portion 21b is larger than the length L1 of the entrance to the second cutaway portion 16 and accordingly the engagement portion 21b cannot fall into the second cutaway portion 16.

Figure 3B:
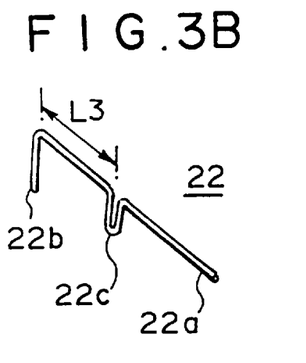

The engagement member 22 shown in FIG. 3B is entirely formed of a resilient material and comprises a base portion 22a, a free end portion 22a bent downward and an abutment portion 22c which is bent downward at a distance L3 from the free end portion 22b, the distance L3 being longer than the length L1 and shorter than L4.

Figure 3C:
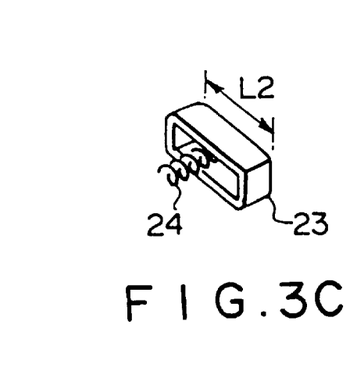

The engagement member 23 shown in FIG. 3C is in the form of a box urged inward of the cartridge insertion passage by a spring 24. The length L2 of the engagement member 23 is larger than the length L1 of the entrance to the second cutaway portion 16.

When the larger capacity magnetic disc cartridge 1 is inserted into a larger-disc drive system having such an engagement member (any one of engagement members 21, 22 and 23), the first cutaway portion 15 of the casing 10 is first brought into engagement with the free end of the engagement member and the engagement member is displaced outward by the tapered surface of the first cutaway portion 15, thereby permitting insertion of the magnetic disc cartridge 1 so long as it is inserted in the regular direction. When the magnetic disc cartridge 1 is inserted in a wrong direction, the engagement member prevents insertion of the cartridge 1 in the same manner as described above.

Even if the larger capacity magnetic disc cartridge 1 is further inserted and the free end portion or the engagement portion of the engagement member is brought to the second cutaway portion 16, the engagement portion cannot fall in the second cutaway portion as described above, and accordingly further insertion of the cartridge 1 is permitted.

When the magnetic disc cartridge 1 is inserted to a predetermined position, the shutter 13 is moved to its open position where the openings 13a are aligned with the head insertion openings of the casing, thereby giving the magnetic head access to the magnetic disc medium 12 for recording and reading.

The smaller capacity magnetic disc cartridge 3 shown in FIG. 6 can be inserted to the predetermined position without problem and the shutter 13 is moved to its open position.

As described above, insertion of the larger capacity magnetic disc cartridge 1 into the smaller-disc drive system shown in FIG. 1 is prevented by engagement of the engagement member 55 and the second cutaway portion 16 and accordingly the shutter 13 is not opened. When insertion of the magnetic disc cartridge 1 is prevented, the cartridge 1 is drawn out. At this time, the engagement member 55 in engagement with the second cutaway portion 16 is displaced outward by the inclined surface 16a and disengaged from the second cutaway portion 16. Accordingly the engagement member 55 does not interfere with drawing the cartridge 1.

Second Embodiment

Figure 4:
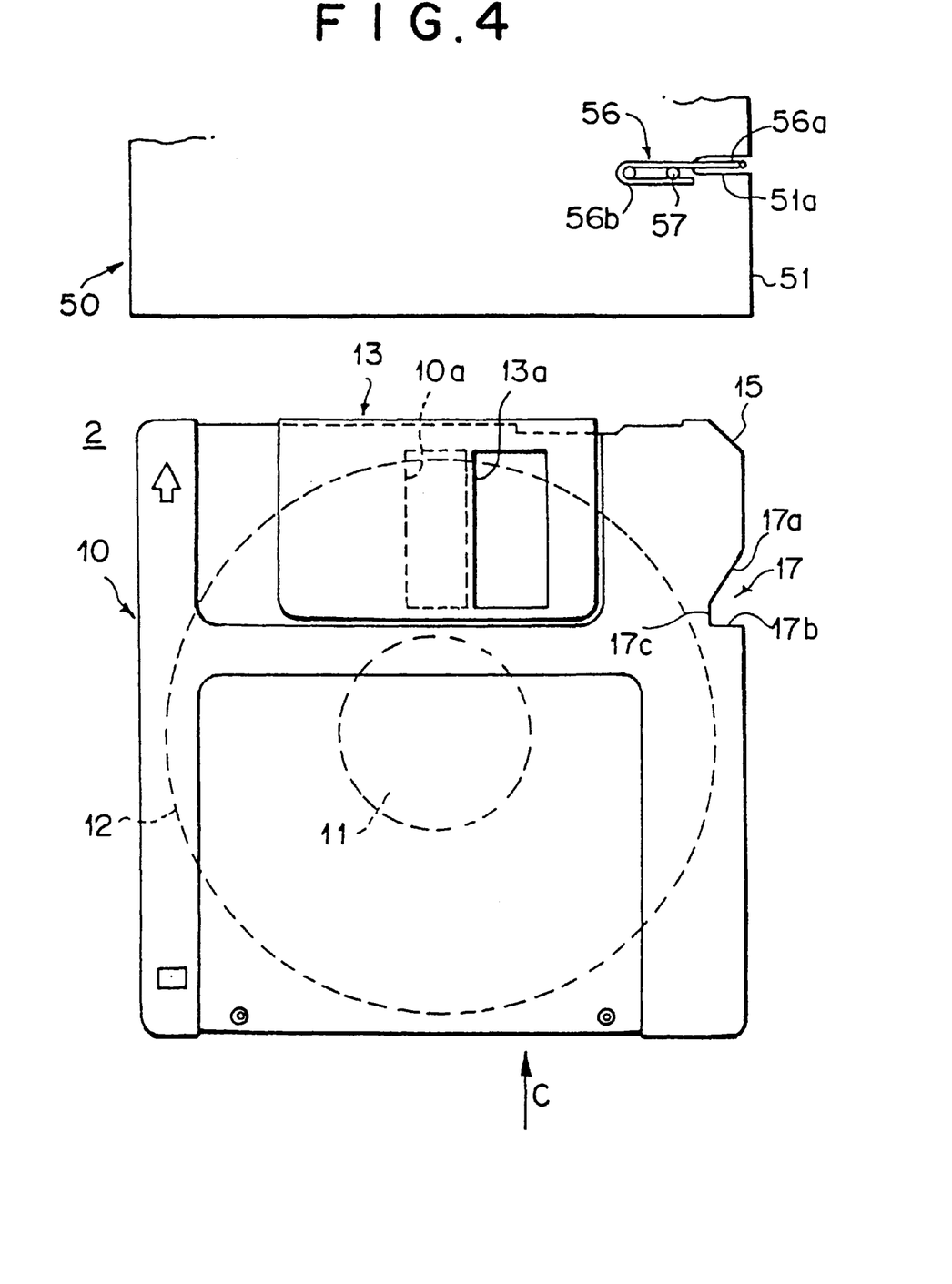
FIG. 4 is a plan view showing a larger capacity magnetic disc cartridge in accordance with a second embodiment of the present invention together with a part of a smaller capacity-disc drive system.

In this embodiment, the magnetic disc cartridge 1 is provided with a means for preventing the magnetic disc cartridge 1 from being loaded in a smaller-disc drive system in which insertion of a magnetic disc cartridge in a wrong direction is prevented by an engagement member which is vertically displaced upon insertion of a magnetic disc cartridge in the regular direction. FIG. 4 is a plan view showing a larger capacity magnetic disc cartridge in accordance with a second embodiment together with a part of the smaller-disc drive system, and FIG. 5 is a perspective view showing insertion action of the larger capacity magnetic disc cartridge.

The magnetic disc cartridge 2 of this embodiment is substantially the same as that of the first embodiment except the shape of the second cutaway portion and accordingly the elements analogous to those of the first embodiment are given the same reference numerals and will not be described here.

The second cutaway portion 17 of the casing 10 in this embodiment comprises, as shown in FIG. 4, an inclined surface 16a inclined inward from the front end of the second cutaway portion 17, a shoulder portion 17b which extends substantially normal to the side edge at the rear end of the second cutaway portion and a parallel portion 17c substantially parallel to the side edge and is substantially trapezoidal in shape.

Figure 5:
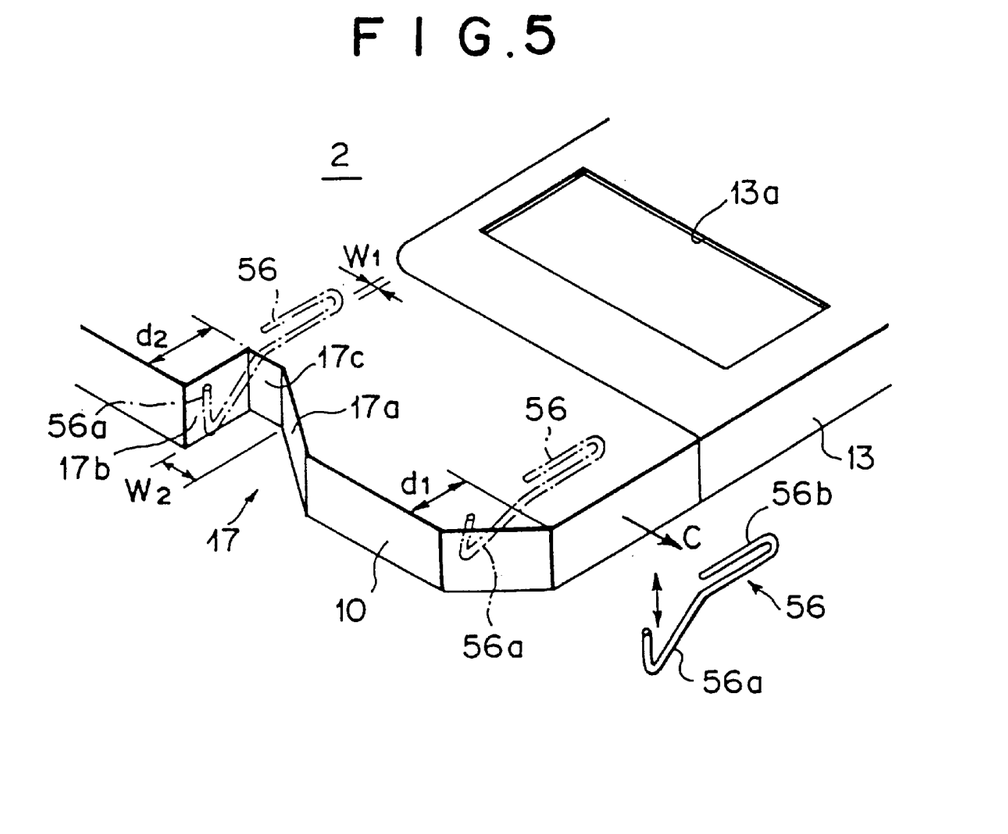
FIG. 5 is a perspective view for illustrating insertion of the larger capacity magnetic disc cartridge of FIG. 4 into the smaller capacity-disc drive system.

As shown in FIG. 5, the depth d2 of the second cutaway portion 17, that is, the distance of the parallel portion 17c from the side edge of the casing 10 is substantially equal to or larger than the length d1 by which the corner of the casing 10 is cut to form the first cutaway portion 15 as measured in the direction normal to the side edge. Further the length W2 of the parallel portion 17c as measured in the direction of the side edge is substantially equal to or larger than the width W1 of an engagement member 56 of a smaller-disc drive system 50 to be described later as measured in the direction of the side edge of the magnetic disc cartridge inserted. That is, the second cutaway portion 17 should be formed in a depth sufficient to engage with the engagement member 56 which falls into the second cutaway portion 17 from above.

The engagement member 56 is formed of a resilient wire and mounted on the upper surface of the bucket 51 of the smaller-disc drive system 50 to extend laterally. The engagement member 56 comprises a U-shaped base portion 56b fixed to the upper surface of the bucket 51 by a fixing member 57 and an engagement portion 56a which extends obliquely downward from the base portion 56b and is bent upward at the free end portion thereof. The engagement portion 56a is received in a notch 51a of the bucket 51 and held there under the resiliency of the engagement member 56. When the engagement portion 56a is in the notch 51a, the engagement portion 56a projects into the cartridge insertion passage of the bucket 51 so that the upper edge of the tapered surface of the first cutaway portion 15 is brought into abutment against the engagement portion 56a of the engagement member 56 as a magnetic disc cartridge is inserted into the bucket 51 in the regular direction.

That is, when a magnetic disc cartridge is inserted into the bucket 51 in the regular direction, the inclined portion of the engagement portion 56a is brought into abutment against the upper edge of the first cutaway portion 15 of the magnetic disc cartridge and resiliently displaced upward to be flat, thereby permitting insertion of the magnetic disc cartridge. On the other hand, when the magnetic disc cartridge is inserted into the bucket 51 in a wrong direction, e.g., upside down or in the reversed direction, the flat corner on the side opposite to the first cutaway portion 15 abuts against the engagement portion 56a of the engagement member 56. At this time, the engagement portion 56a cannot be displaced upward and prevents insertion of the magnetic disc cartridge.

When the larger capacity magnetic disc cartridge 2 shown in FIG. 4 is inserted into the smaller-disc drive system 50 in the regular direction, the engagement portion 56a of the engagement member 56 falls into the second cutaway portion 17 under its resiliency when the engagement portion 56a comes to the parallel portion 17c and engages with the shoulder portion 17b as shown by the chained line in FIG. 5 to prevent further insertion of the magnetic disc cartridge 2.

In this state, since the depth d2 of the second cutaway portion 17 is substantially equal to or larger than the length d1 of the first cutaway portion and the length W2 of the parallel portion 17c is substantially equal to or larger than the width W1 of the engagement member 56, the engagement portion 56a of the engagement member 56 fully restores its original angle of inclination and falls sufficiently deep into the second cutaway portion 17.

Also the larger capacity magnetic disc cartridge 2 of this embodiment is not provided with a recess 18 on the front edge of the casing 10 which is provided in the conventional smaller capacity magnetic disc cartridge 3 to insert a shutter opening lever for opening and closing the shutter 13.

The magnetic disc cartridge 2 of this embodiment is loaded in a larger-disc drive system having an engagement member for preventing insertion of a magnetic disc cartridge in a wrong direction such as shown in FIGS. 3A to 3C.

As described above, insertion of the larger capacity magnetic disc cartridge 2 into the smaller-disc drive system shown in FIG. 4 is prevented by engagement of the engagement member 56 and the second cutaway portion 17 and accordingly the shutter 13 is not opened. When insertion of the magnetic disc cartridge 2 is prevented, the cartridge 2 is drawn out. At this time, the engagement member 56 in engagement with the second cutaway portion 17 is displaced upward by the inclined surface 17a and disengaged from the second cutaway portion 17. Accordingly the engagement member 56 does not interfere with drawing the cartridge 2.

Though the second cutaway portion 17 in this embodiment is preferably associated with the engagement member 56 shown in FIG. 4 which is displaced up and down, it may be associated with the engagement member 55 shown in FIG. 2 which is displaced laterally. Further though the engagement member 56 in this embodiment can also be engaged with the triangular second cutaway portion 16 shown in FIG. 1, it is necessary that the second cutaway portion 16 is wide or deep enough so that the inclined portion of the engagement portion 56 can entirely fall into the cutaway portion 16 in order to ensure a sure engagement. Accordingly if triangular in shape, the second cutaway portion can interfere with the magnetic disc medium 12 in the casing 10. So the second cutaway portion 17 is made trapezoidal in the second embodiment.

What is claimed is:

1. A magnetic disc cartridge comprising a large capacity magnetic disc medium held for rotation in a casing provided with an opening which gives a magnetic head access to the magnetic disc medium and is normally closed by a shutter, wherein the casing is provided with a first cutaway portion at a front corner between the front edge and one side edge of the casing, and a second cutaway portion which is adapted to engage with an engagement member of a smaller-disc drive system which is brought into engagement with the first cutaway portion, wherein the smaller-disc drive system exclusively receives a magnetic disc cartridge having a capacity smaller than the large capacity disc medium and wherein the second cutaway portion is formed on the one side edge of the casing and comprises an inclined surface inclined inward from a front end of the second cutaway portion and further comprises a shoulder portion which extends substantially normal to the side edge at a rear end of the second cutaway portion and a parallel portion substantially parallel to the side edge to form a substantially trapezoidal shape.

2. A magnetic disc cartridge as defined in claim 1 in which the distance of the parallel portion from the side edge of the casing is substantially equal to or larger than the length by which the corner of the casing is cut to form the first cutaway portion as measured in the direction normal to the side edge and the length of the parallel portion as measured in the direction of the side edge is substantially equal to or larger than the width of the engagement member of the smaller-disc drive system as measured in the direction of the side edge of the magnetic disc cartridge.

* * * * *